United States Patent [19]

Ostendarp et al.

[11] Patent Number: 5,987,923
[45] Date of Patent: Nov. 23, 1999

[54] PROCESS AND APPARATUS FOR HOT FORMING PRECISION STRUCTURES IN FLAT GLASS

[75] Inventors: Heinrich Ostendarp; Marita Paasch, both of Mainz, Germany

[73] Assignee: Schott Glas, Mainz, Germany

[21] Appl. No.: 09/048,633

[22] Filed: Mar. 26, 1998

[30] Foreign Application Priority Data

Mar. 29, 1997 [DE] Germany ............................ 197 13 309

[51] Int. Cl.⁶ .................................................. C03B 11/12
[52] U.S. Cl. ................................ 65/102; 65/106; 65/171; 65/255; 65/273; 65/355; 65/356; 65/370.1; 65/374.13
[58] Field of Search ................................ 65/29.19, 94, 93, 65/102, 106, 162, 171, 255, 256, 245, 273, 355, 370.1, 374.13, 356

[56] References Cited

U.S. PATENT DOCUMENTS

| | | | |
|---|---|---|---|
| 528,240 | 10/1894 | Sievert | 65/362 |
| 661,025 | 10/1900 | Ripley et al. | 65/94 |
| 798,643 | 9/1905 | Wadsworth | 65/93 |
| 907,656 | 12/1908 | Wadsworth | 65/185 |
| 1,028,128 | 6/1912 | Neuhauser | 65/94 |
| 1,248,582 | 12/1917 | Wiley | 65/106 |
| 1,261,939 | 4/1918 | Johanson | 65/156 |
| 1,297,566 | 3/1919 | Johanson | 65/255 |
| 1,308,408 | 7/1919 | Gast | 65/104 |
| 1,528,194 | 3/1925 | Burgess | 65/255 |
| 2,702,411 | 2/1955 | Winstead | 264/548 |
| 3,238,031 | 3/1966 | Nikoll | 65/94 |
| 3,369,883 | 2/1968 | Smith | 65/112 |
| 5,118,543 | 6/1992 | McColl | 428/34 |
| 5,224,978 | 7/1993 | Hermant et al. | 65/94 |

FOREIGN PATENT DOCUMENTS

| | | |
|---|---|---|
| 0 493 202 A1 | 7/1992 | European Pat. Off. |
| 904468 | 11/1945 | France . |
| 2 741 335 | 5/1997 | France . |
| 31 14 881 A1 | 10/1982 | Germany . |
| 31 14 881 C2 | 2/1983 | Germany . |
| 38 08 380 A1 | 9/1989 | Germany . |

*Primary Examiner*—Sean Vincent
*Attorney, Agent, or Firm*—Michael J. Striker

[57] ABSTRACT

Flat glass provided with precision structures is required for precision applications, especially for glasses with optical properties, for example for modern flat display screen glass. The process of the invention for hot forming precision structures in or on flat glass includes pressing a heated forming tool with a structuring surface into a surface of the flat glass. In this process the structuring surface of the forming tool is heated locally from the outside of the forming tool, prior to and/or during contacting of the forming tool with the glass surface until a predetermined surface depth corresponding to a height of the structures being formed has reached a process temperature at which a melting to form the structures occurs on contacting the forming tool to the glass surface. The local heating of the structuring surface (2) is performed by laser radiation which is passed through the flat glass (3) to the structuring surface (2). Alternatively an inductive or resistance heating can be performed.

34 Claims, 4 Drawing Sheets

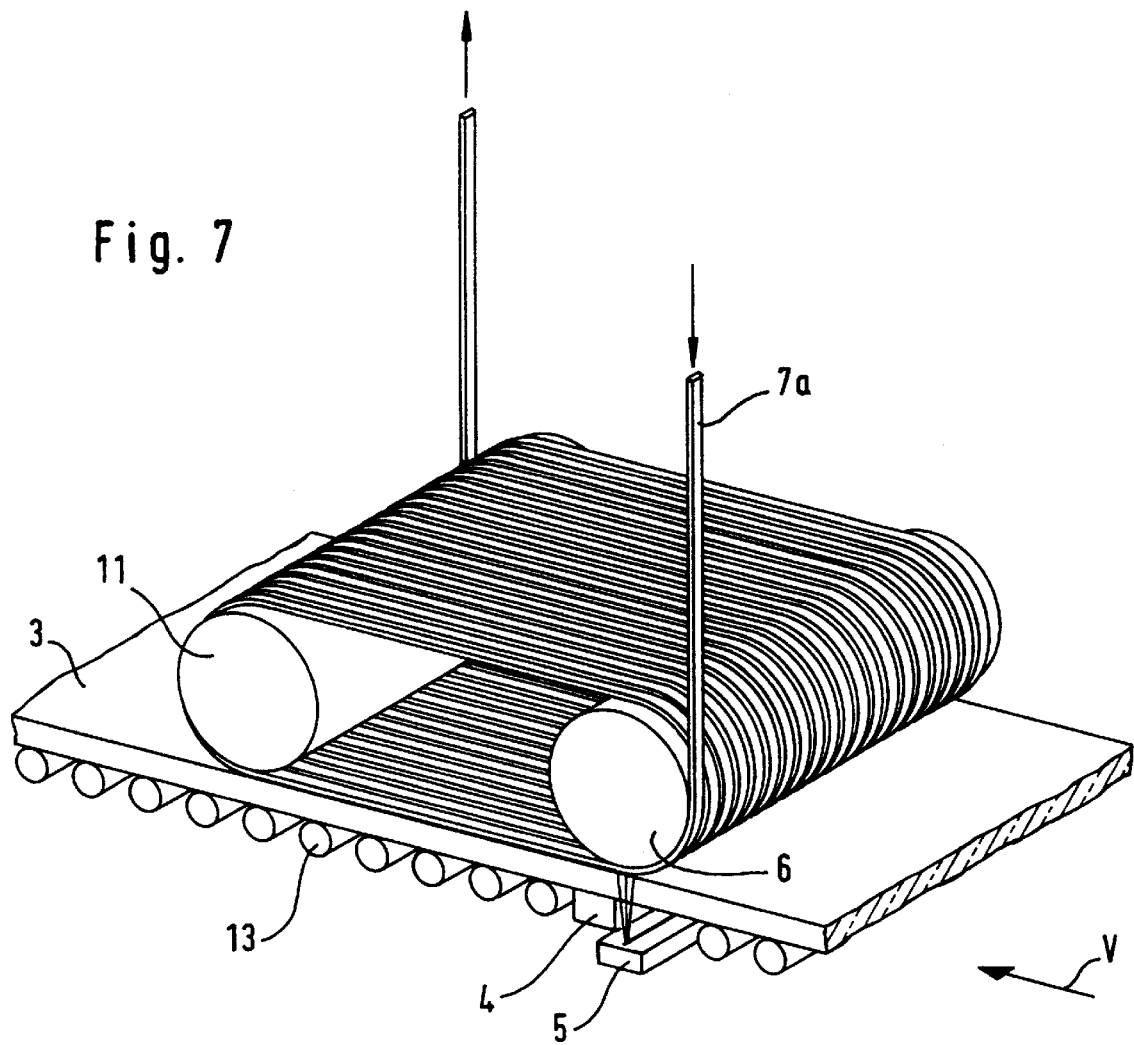

PROCESS AND APPARATUS FOR HOT FORMING PRECISION STRUCTURES IN FLAT GLASS

CROSS-REFERENCE

The instant subject matter is related to the disclosure in copending U.S. patent application, entitled "Method and Apparatus for making Large-scale Precision Structures in Flat Glass" based on German Patent Application 197 13 311.8-45 of Mar. 29, 1997, Heinrich OSTENDARP, inventor; and also in another copending U.S. patent application, entitled "Forming Tool for Structuring Flat Material, especially Plate Glass" based on German Patent Application 197 13 312.6-45 of Mar. 29, 1997, Heinrich OSTENDARP and Marita Paasch, inventors.

BACKGROUND OF THE INVENTION

The present invention relates to a process for hot forming precision structures in or on flat glass, especially plate glass, in which a heated forming tool is pressed with its structuring surface on one side of the flat glass. The invention also relates to an apparatus for performing that process.

Flat glass provided with large-scale precision structures is required for precision applications, especially in the optical glass field. This type of glass includes, for example display panels of new generation flat display screen devices (Plasma Display Panels (PDP), Plasma Addressed Liquid Crystal (PALC)). Micro-channel structures for control of individual lines or columns, which extend over the entire active display screen width or height and in which a plasma is ignited by electric discharge, are provided in this flat display screen glass. The boundary of an individual channel at both sides or ends is provided by a rectangular crosspiece whose width is as small as possible (i.e. <100 μm). In order to obtain a sufficient discharge volume, the height of the crosspiece is substantially larger than its width. The spacing of the crosspieces should be as small as possible. Currently typical values of between 360 μm and 640 μm are achieved in small scale production. The height of the crosspieces amounts to from about 150 μm to 250 μm at a width of from 50 μm to 100 μm.

During the structuring of this flat display screen glass, which for example is a 25"-PALC screen of a size of 360 mm×650 mm, the exact lateral dimensioning, relative positioning and reproducibility of the channel and thus the stability of the forming tool are crucial because of the later positioning of the electrodes. With a method based on hot shaping by means of a conventional Chromium-Nickel-Steel tool, the thermal expansion coefficient amounts to about $12 \times 10^{-6}$/K. For example, for a tool length of about 360 mm, as required for a 25"-PALC display screen, this always causes a length change of about 4 μm per K temperature fluctuation. Considering that the required positioning accuracy of the electrodes in the micro-channels is in the range of ±10 μm, a temperature fluctuation of ±2.5 K can cause considerable problems. The permissible temperature fluctuations are considerably reduced in the larger display screens, for example 42"-display screens.

The problems are similar in other applications of flat glass with precision structures.

Existing specifications limit however the possible applications of conventional hot forming methods, such as rolling or pressing. Two different process variants of the conventional hot forming methods exist.

The hot pressing occurs with very hot glass. The forming tool, a roller or press member provided with a suitable structure, is cooled, so that energy is drawn from the hot glass and solidification of the structure occurs.

In cold pressing an energy input occurs by means of a forming tool, which comprises a roller or a press member and is heated by a suitable energy source.

Conventional hot shaping methods have the following disadvantages:

When a contact between the glass and a press or roll tool acting as the forming tool occurs only for a short time, i.e. prior to solidification the work tool is removed from the glass, because of flow of the glass structure, a strong rounding occurs after this contact.

In a long-duration contact which is used in a cold-pressing method, intolerable stresses arise because of strong temperature differences and different thermal expansions of the tool and glass.

It is more difficult to prevent adherence of the tool to the glass in both methods with increasing tool temperature.

An additional essential requirement of the method of making these glasses is the maintenance of a stable production process, in which the local distribution and form of the structures are kept extremely constant. Additional limitations of the conventional hot forming are as follows:

Since the forming tool is heated completely in a conventional hot shaping, in order to achieve a sufficient surface temperature on the contact surface for the glass, high non-reproducible temperatures occur in the required precision range of ±2 K ( with typical work tool steels and glass surface areas required by the specifications), which lead to intolerable deformation of the work tool.

A higher tool wear, which requires a replacement of the forming tool, occurs during the making of structured glass with reduced structure radii.

The corresponding disadvantages are also present in the process described in DE 38 08 380 A1 for impressing programs on glass disks, in which a pre-pressed glass disk with a smooth surface is heated by a radiator plate in a limited surface region and, after that, is immediately provided with the desired surface structure by an impressing stamp.

SUMMARY OF THE INVENTION

It is an object of the present invention to provide a process of the above-described type and an associated apparatus, such that a flow of the glass structures, adherence of the glass and the tool and uncontrolled deformation of the forming tool, which leads to dimensional fluctuations of the structures, are avoided. At the same time a large productivity must be achieved.

According to the invention, the above-described objects are attained, when the structuring surface of the forming tool is heated locally from the outside of the forming tool, prior to and/or during contacting of the forming tool with a surface of the glass, until a predetermined surface depth in the forming tool corresponding to a height of the structures being formed in the glass has reached a process temperature at which a melting to form the structures occurs on contacting the forming tool to the glass surface.

The apparatus according to the invention includes at least one external heat source for the forming tool, by means of which, immediately prior to and/or during contacting of the forming tool with the glass surface, the forming tool is heated locally from the exterior until a predetermined surface depth in the forming tool determined by a height of the structures being formed in the glass has reached a process temperature at which a melting to form the structures occurs on contacting the forming tool to the glass surface.

Glass bodies with an exact predetermined shape (desired curvature) and high surface quality, e.g. lenses, are disclosed in DE 31 14 881 C2. These lenses are made by a method in which a glass body whose shape is largely already in the desired form is heated in the required surface region at a temperature sufficient for deformation by pressing to a layer depth sufficient for achieving the desired curvature by deformation and is deformed in this heated region.

In the known case a blank after-pressing of the glass body is performed in order to obtain a smooth surface not having the so-called "orange peel structure". In contrast in the case of the present invention structures with a predetermined surface depth are produced in the glass surface by the local heating of the forming tool immediately prior to or during the forming.

Advantageously laser radiation transmitted through the flat glass is used for the local heating of the structuring surface of the forming tool. This sort of arrangement has the advantage of providing a very uniform and reproducible heating of the structuring surface, which alternatively is obtainable by electric or inductive heating.

The structuring surface of the forming tool is heated advantageously to a temperature which is larger than Tg and smaller than Tk. The temperature Tg is the transition temperature of the glass to be structured and the temperature Tk is the temperature at which the forming tool would adhere to the glass. Particularly precise structures are obtained at the highest possible temperatures, i.e. at high Tk. For high productivity the flat glass should be pre-heated to a temperature which is under Tg, preferably from 50 K to 200 K less than Tg.

To avoid heating the forming tool too much by heating the structuring surface by the external heat source, the forming tool is cooled internally.

The heating by the laser radiation can be assisted, especially for pre-heating, by other suitable heat sources, for example, flame strips, in order to avoid the otherwise necessary use of an expensive high power laser with very high power levels.

Several possibilities exist for forming the structures by the forming tool. Thus the forming tool is continuously rolled over the glass surface to be structured according to a preferred embodiment of the invention.

In order to avoid a continual expensive exchange of the total forming tool on account of the tool wear, the structures are preferably formed with a two-part forming tool, which comprises a base tool and a forming member releasably attached to it, the forming member having the structuring surface on it. When the forming member with the structuring surface is worn out only the forming member needs to be replaced which is comparatively simple and economical.

This two-part structure for the forming tool provides more freedom in selection of materials. In a preferred embodiment of the invention the base tool is made from a material with a comparatively small thermal conductivity and the forming medium is made from a material with a comparatively large thermal conductivity. This provides conditions for an outstanding local heating to the surface depth.

A reduced tendency to adhere can be obtained by selection of a forming member with a high melting temperature. According to a further feature of the invention it is particularly advantageous when the forming member is rolled off the forming tool during rolling of the forming tool over the glass, pressed into the glass and left there during the cooling stage. Because of the reduced heat capacity of the forming member in comparison to the base tool, a substantially faster cooling of the formed structured occurs, which leads to a greater productivity and a more precisely formed structures.

BRIEF DESCRIPTION OF THE DRAWING

The objects, features and advantages of the invention will now be illustrated in more detail with the aid of the following description of the preferred embodiments, with reference to the accompanying figures in which:

FIG. 7 is a perspective view of an apparatus according to the embodiment of FIGS. 6 and 6A, including a laser diode array for heating the structuring surface of the forming tool.

DESCRIPTION OF THE PREFERRED EMBODIMENTS

Figure 1:
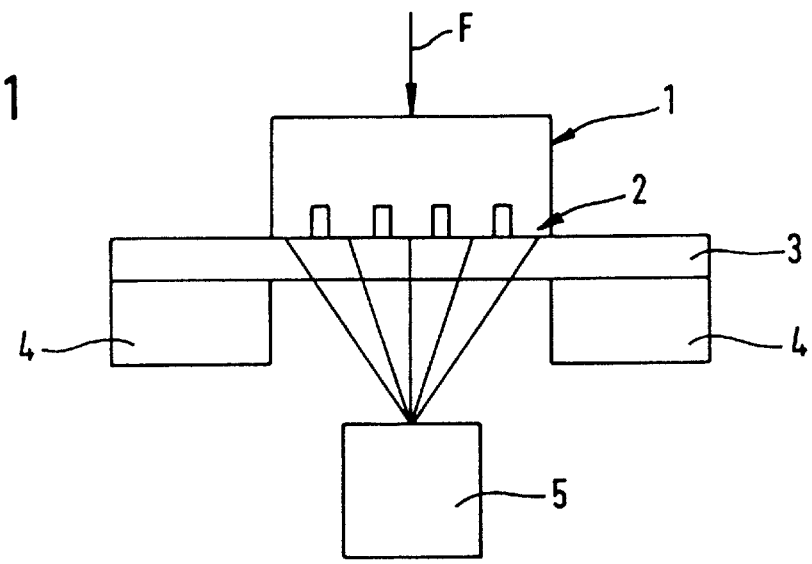
FIG. 1 is a main diagrammatic plan view of an apparatus according to the invention for heating of a structuring surface of a forming tool, by means of a laser with the laser radiation from the laser passing through a transmitting medium (glass)

FIG. 1 shows an apparatus for a process of hot forming precision structures—here in the form of channels that are separated by crosspieces—in a plate or flat glass 3, which in the present embodiment is a flat glass with micro-channel structures for a flat display screen. The apparatus provides a heated forming tool 1 with a structuring surface 2, which is pressed by means of a force F on the upper side of a flat glass 3, in order to form the described precision structures there. The apparatus has counter-force-taking members 4, in order to balance the force F applied to the flat glass 3. The forming tool 1 is heated immediately prior to and/or during contact with the glass surface from the exterior locally. However the structuring surface 2 of the forming tool 1 is only heated up to a predetermined surface depth corresponding to the height of the structures being formed at a temperature at which a melting to form the structures occurs on contacting the forming tool to the glass surface. In the present embodiment laser radiation is directed through the flat glass 3 to the structuring surface 2 of the forming tool 1 by means of a laser 5 for local heating of the structuring surface 2. Alternatively an inductive or electrical resistance heating can be performed. Because the heat energy is only supplied locally to the structuring surface, a complete heating of the forming tool and the flat glass can be avoided.

Because only a local heating of the structuring surface occurs a complete heating of the forming tool can advantageously be avoided with precise temperature control of the surface, whereby the above-mentioned disadvantages are eliminated.

The laser 5 is selected so that it produces laser radiation that has as high as possible a transmission through the selected flat glass, i.e. no noteworthy heating of the glass occurs, and that heats the structuring surface 2 to a temperature at which a melting occurs on contact with the glass. The glass 3 is heated as needed by means of a another suitable energy source to a temperature at which the glass still has a suitable mechanical stability (under the transition temperature Tg), and only the remaining energy required for melting the surface is provided by the laser 5. The temperature, to which the glass can be pre-heated, amounts to about 50 to 200 K under Tg. It should be as far under Tg as possible since the glass 3 remains solid. This has the disadvantage however that longer laser irradiation times and larger stresses and strains occur in the crosspieces formed.

In order to avoid heating the forming tool 1 too much during heating of the structuring surface the tool 1 is cooled internally with known means.

The heating of the forming tool 1 and/or its structuring surface 2 during forming occurs at temperatures above the Tg of the glass, however below the temperature Tk, in which the glass would adhere to the tool. This latter temperature depends on the material of the forming tool and, if present, of an anti-adhering coating and on the glass type. For example, chromium-nickel-steels are useable as materials to which the glass adheres poorly up to about 850K, while they are inclined to adhere at higher temperatures. Platinum-gold alloy, a material which is very expensive, adheres still more poorly, so that one must use smaller amounts of this material or simpler materials.

If necessary the heating of the structuring surface 2 of the forming tool 1 by means of laser 5 can be complemented by other suitable conventional heat sources (flame strips or the like). This additional heating is especially advantageously in the initial stages. The structuring surface 2 is pre-heated thus up to about Tg.

The use of the laser 5 in comparison to conventional heat sources has the advantage that a more exact control of the location and amount of the heating is possible. A Nd-YAG laser (wavelength 1064 nm) and a high power diode laser (wavelength about 800 nm) are suitable as laser radiation source. It is necessary, as indicated diagrammatically in FIG. 1, to provide apparatus elements for guiding the laser radiation to the forming tool 1 or its separate structuring surface 2, but elements of this type are well known to those skilled in the art.

Figure 2:
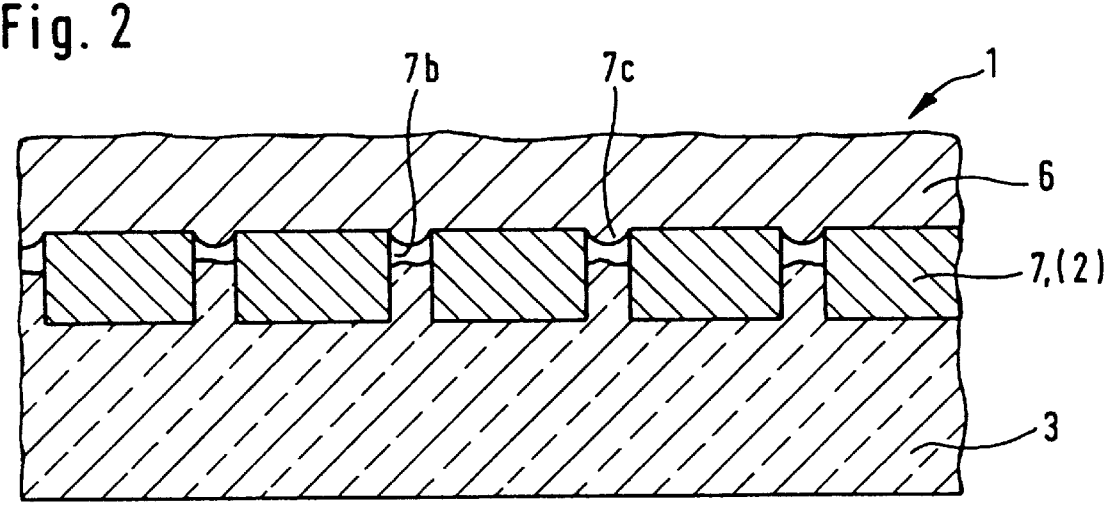
FIG. 2 is a detailed diagrammatic cross-sectional view of a two-part forming tool according to the invention having a base tool and a forming member.

The high cost and maintenance expense connected with the above-mentioned high tool wear of the forming tool 1 can advantageously be avoided because, as is particularly clearly shown in FIG. 2, the structuring surface 2 of the forming tool 1 subject to the wear is formed on a separate forming member 7, which is releasably attached to the base tool 6. This forming tool can, as illustrated, be formed by different types of structures. A thin structuring sheet 7 is provided in the example according to FIG. 2, which has throughgoing openings 7b conforming to the crosspieces or crossbars to be formed. As shown in FIG. 2, structures 7c corresponding to the throughgoing openings 7b are provided in the surface of the base tool 6 for positioning of the sheet. These structures are also substantially easier to make than a structured single component tool for direct shaping or forming in flat-display-screen-glass applications. The thin sheet, which provides the structuring surface 2, can have a thickness of about 50 $\mu$m to 600 $\mu$m, preferably about 100 $\mu$m to 250 $\mu$m for display applications. The spacing of the throughgoing openings 7b (slits) in the sheet required for forming the crosspieces or crossbars is about 150 $\mu$m to 750 $\mu$m and their slit width is from 50 $\mu$m to 100 $\mu$m.

Instead of the throughgoing openings 7b in the sheet 7 also cavities or recesses, such as the cups used in printing techniques, can be provided.

A material with reduced thermal expansion and high friction coefficient, especially a special ceramic material, can advantageously be used for the base tool 6 because of the separation of the forming tool parts, namely the structuring sheet 7 from the base tool 6, which can be formed by a roller or piston. Other factors, for example a minimal adherence to glass, higher wear resistance and higher temperature stability, as e.g. attained by the above-mentioned chromium-nickel-steel or platinum-gold alloy, can be considered in the selection of the material for the forming member 7.

Thus it is conceivable to use quarzal as the material for the base tool 6, which has a very small thermal expansion coefficient of $0.56 \times 10^{-6}$/K. Then for equal permissible length variations about a 20-fold temperature variation is permitted in comparison to that for steel as the base material. These amount to about ±40K in a 25"-display.

The quarzal material has a reduced thermal conductivity. If then one uses a sufficiently thermal conductive material, e.g. a structured sheet according to FIG. 2, for the forming medium, then an outstanding local isolated heating to the predetermined surface depth is possible according to an advantageous embodiment of the two-component tool. Since quarzal simultaneously has a poor electrical conductivity, alternatively to the use of quarzal as the material according to FIG. 1 for the base tool 6 an inductive or electrical resistance heating of the forming medium 7 is possible.

An additional advantage to the separation of the base tool 6 from the forming member is that the forming member 7 may be left in the glass after the shaping until it has cooled. A substantially more rapid cooling then occurs in comparison to leaving a completely conventional tool in the glass structure because of reduced heat capacity of the forming member. Stresses and strains between the glass 3 and the forming tool 1 are minimized especially in segmented forming mediums provided with throughgoing holes 7b, as in the case of the sheet 7 of FIG. 2, since thermal expansion of the sheet is compensated by the throughgoing holes. The release of the forming member can be facilitated by a conicity of raised portions of the structuring surface.

The sheet 7 subjected to wear can be replaced without difficulty in suitable embodiments of the invention without replacing the base tool. For this purpose different embodiments of the apparatus are described hereinbelow.

From the detailed cross-sectional view of FIG. 2, it is clear that the heating of the forming tool 1 must occur in principle only on the surface face of the forming member facing the glass, because the surface 2 of the forming tool 1 which is furthest forward must be forced into the glass 3 and the glass material must be displaced because of that. The glass material is pressed to the side then by elements on this structuring surface and can be force into the intervening spaces 7b. Essentially only the surfaces of the forming tool facing the glass material are heated using the laser 5, as shown in FIG. 1, while the side surface sections of the furthest forward surface sections are heated together. A heating of additional surfaces of the forming tool 1 is then not required.

Figure 3:
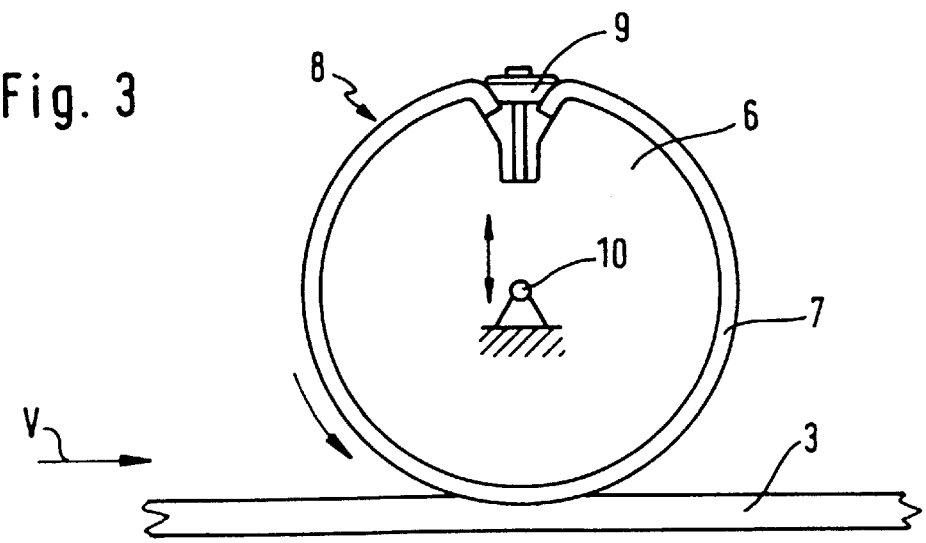
FIG. 3 is a diagrammatic cross-sectional view through a two-part forming tool according to FIG. 2 with a roller as base tool and a structured sheet wrapped around the roller as forming member.

Different embodiments for the forming tool made from the base tool 6 and the separate forming member 7 are possible, of which several are described with the aid of FIG. 3. FIG. 3 shows a forming tool formed as a roller 8 with a base tool 6 and a forming member 7, here a perforated sheet as in FIG. 2, which is attached by means of a clamping device 9 to the base tool 6. The roller 8 analogous to the representation in FIG. 2 has a suitable structure 7c for positioning of the sheet. The rotation axis 10 of the roller 8 is locally fixed in the horizontal direction. The glass 3 is moved with a relative conveying speed V under the roller 8 which rotates in the direction of the arrow and applies the desired structures on rolling over the surface of the flat glass 3. The vertical forces and displacement of the roller 8 are thus advantageously controlled in order to control the impression depth in the glass 3.

The feed speed of the flat glass 3 is about 0.1 to 1 m/min. Using a 200 mm diameter roller, the forming tool is heated about 1 to 10 mm in front of the contact of the roller with the glass, i.e. about 1 sec prior to contacting the forming tool with the glass 3 it is heated.

In the embodiment derived from rotogravure paper printing methods thus the entire base tool is contacted with the forming member. An even contact of the forming member 7 on the base tool 6 is guaranteed by suitable clamping methods 9 derived from rotogravure printing methods.

In order to keep the roller axis 10 so that it moves only in a vertical direction, as indicated by the arrow, various construction possibility are available to those skilled in the art. The arrangement can also be designed so that the roller 8 that is pressed against the glass 3 with a comparatively large force F rotates only by displacement of the glass plate 3. A complete drive for rotation of the roller around the axis 10 can be provided.

Figure 4:
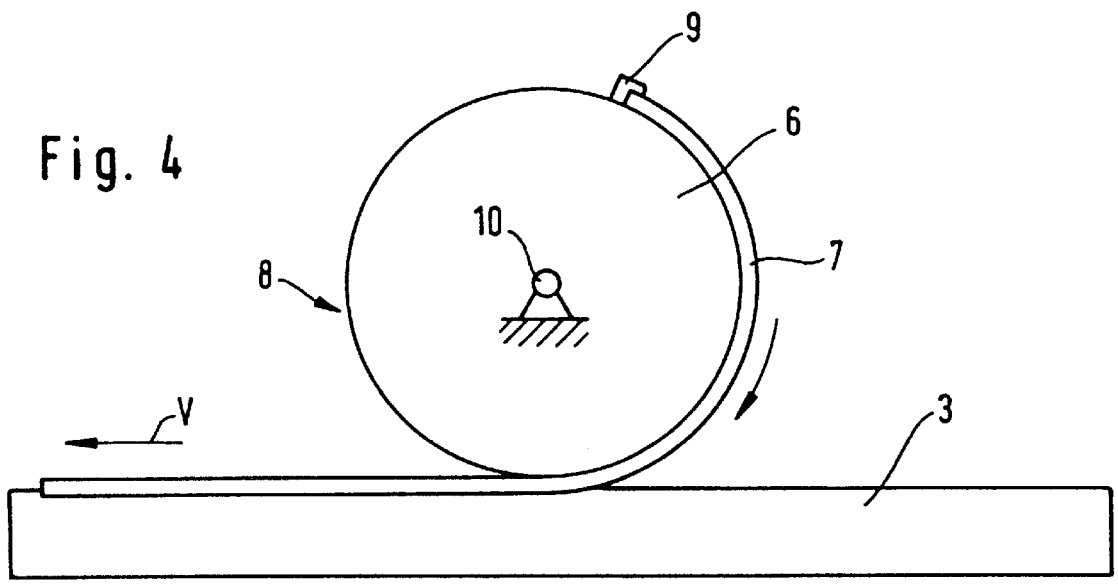
FIG. 4 is a diagrammatic cross-sectional view through a two-part forming tool according to FIG. 3, in which a forming member in the form of a structured sheet is rolled off the base roller during the rolling of the base roller on the glass, is pressed on the glass and remains there during the cooling phase on the glass.

FIG. 4 shows another embodiment for application of the desired structures in or on the flat glass 3 moving horizontally with displacement V by means of a roller 8, which is constructed according to FIG. 3. In contrast to the embodiment of FIG. 3 a forming member in the form of a structuring sheet 7 is pressed on the glass during rolling of the roller 8, unwound from the base tool 6 and left there during the cooling stage. A mechanical stabilization of the glass structure (forming member 7 prevents the flowing away of the still fluid glass) occurs during the cooling stage, which does not occur in conventional hot forming processes. The cooled forming member 7 can be easily removed again from the formed structure because of the greater thermal contraction relative to the glass 3 after forming of the structures in the flat glass 3. A gentle conicity of the raised portions of the forming tool 7 assists this release.

Figure 5:
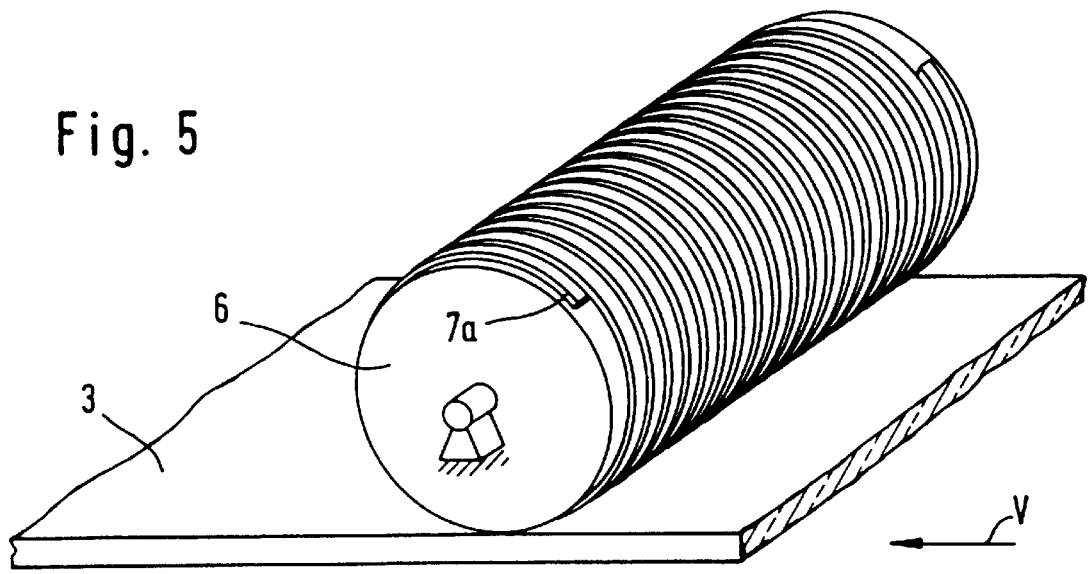
FIG. 5 is a perspective view of a two-part forming tool with a base roller having a strip of material wound around it many times in a coil-like manner.

An additional embodiment is illustrated in FIG. 5, in which the forming tool is not, as in FIGS. 3 and 4, a continuous structuring sheet, but is a strip 7a of material wound in a coil-like manner around the roller-like base tool 6. The embodiment of FIG. 5 is so-to-say a variation of the embodiment of FIG. 3 in which instead of a continuous sheet 7, beginning at one end of the roller the strip 7a of material is wound around a base roller 6 along a coil-like pre-structured path which operates to space portions of the strip of material from each other. A modification, namely a gap existing between coils of the strip wound around the base tool 6, is present in this embodiment in contrast to the embodiment of FIG. 3. Because of that the embodiment according to FIG. 5 is dedicated to making linear structures in the flat glass 3, for example, which must be provided in the above-mentioned flat display screens.

Figure 6:
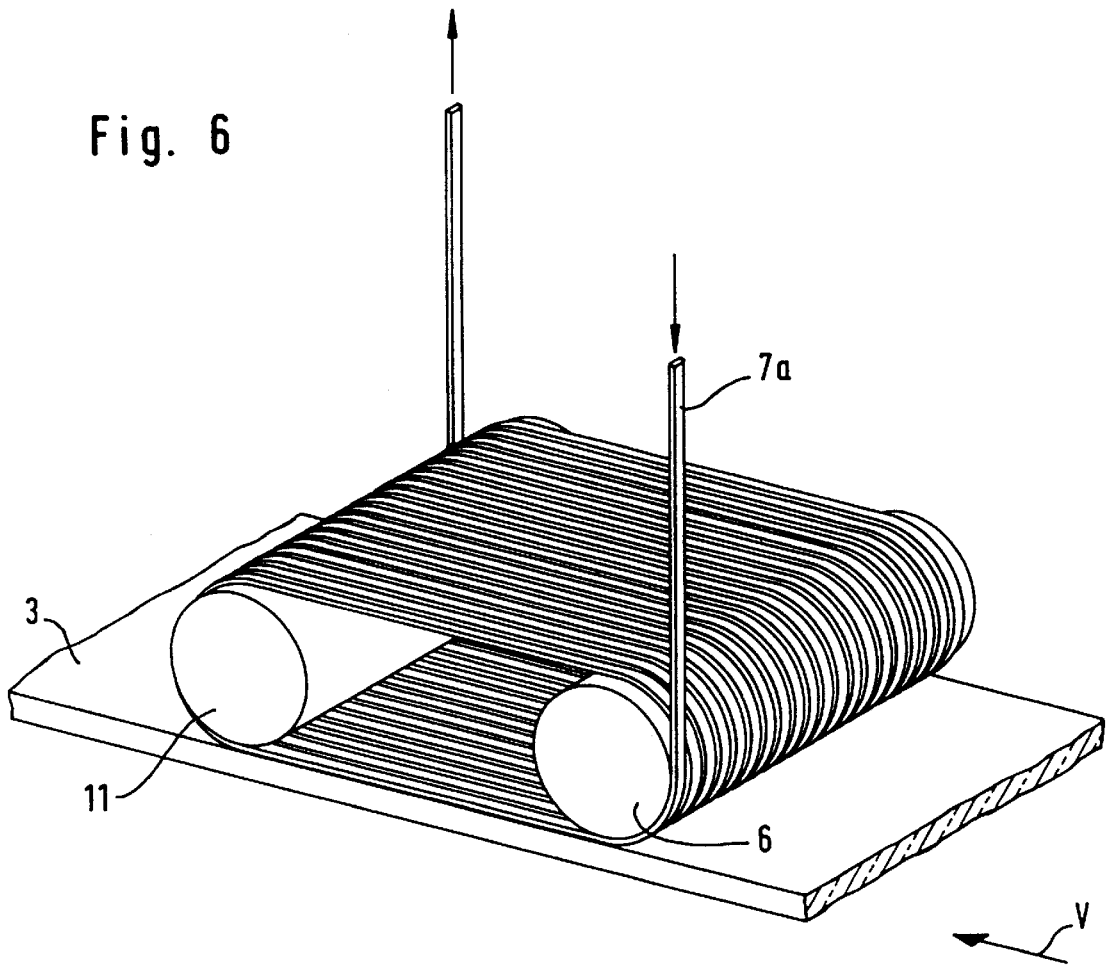
FIG. 6 is a perspective view of a forming tool comprising two axially parallel rollers, of which one is the base roller with a guide structure in the form of circumferential rings perpendicular to the roller axis, with a strip of material as forming member which is wound around them many times.

An additional embodiment, in which the forming tool is not a complete sheet, but is formed as a strip 7a of material, is shown in FIG. 6. While the strip of material is fixed to the roller 6 in the embodiment of FIG. 5 and this roller 6 with the strip 7a of material is rolled over the surface of the flat glass 3, as shown in the embodiment of FIG. 6, the strip 7a of material is left for a predetermined time on the forming structures after melting of the glass. The embodiment according to FIG. 6 provides two axially parallel rollers, a base roller 6 and an auxiliary roller 11. The base roller 6, at whose one end the strip 7a of material is fed in the direction of the arrow, is provided with circumferential rings R perpendicular to the roller axis for guiding the strip 7a of material, which also act to position the strip of material. The base roller 6 also serves to press the strip 7a of material for structuring into the flat glass 3 in order to leave it for structuring during the cooling stage in glass 3. During the cooling stage a mechanical stabilizing of the glass structure (no flow) as in the embodiment of FIG. 4, which does not occur in conventional hot forming processes, results. After the structuring the cooled forming strip medium 7a is removed by means of the auxiliary roller 11 axially parallel to the base roller 6. This auxiliary roller 11 is advantageously not structured in order to be able to compensate for an eventual temperature and thus associated length variations of the base roller 6. The strip of material is taken off at one end of the auxiliary roller 11 according to the shown arrow. It is possible to provide several strip inputs and several outputs.

The strip 7a is guided on the lower auxiliary roller in practice by moving the glass 3, since the glass is very rapidly solidified after structure formation by the strip of material localized on the base roller and because of that the strip 7a is laterally fixed until being taken off from the auxiliary roller 10.

The width of the strip 7a forming the structures is from, or from about, 150 μm to 750 μm, less a crosspiece width of from, or from about, 50 μm to 100 μm, advantageously from, or from about, 200 μm to 600 μm. It is also possible to use strips with a width of under 150 μm, which however reduces the friction of the strip. The spacing of strip segments from each other, predetermined by the spacing of the guide rings R on the base roller 6, should be about 20 to 120 μm, advantageously as small as possible. The limiting conditions regarding the adherence to glass and the costs described in connection with the embodiment of FIG. 1 apply to the material from which strip of material used in the embodiment of FIGS. 5 and 6 is made. Since a platinum-gold alloy has a special advantage because of its non-adherence with glass, but on the other hand is however very costly, a solid strip made from this material must be remelted. In order to avoid this expense, alternatively a steel strip is used as base material, which has a suitable tensile strength and is provided with an anti-stick layer.

The strip 7a of material can be advantageously heated by means of a laser, but, as mentioned above, an inductive or electrical heating can also be used.

A base roller 6 made from quarzal must be tempered with a tolerance of about ±40° C. in the example of a 25"-display screen in display applications, so that no additional thermal expansion occurs which would prevent the desired precision from being ±10 μm. For the purposes of a complete explanation it should be pointed out that the embodiment with the strip of material according to FIG. 6 corresponds substantially in its structure to the known wafer saw. The rollers 6 and 11 can be kept a comparatively small distance from each other, almost contacting each other, because of the rapid cooling of the forming member in the glass. It must be guaranteed that the strip 7a of material remains for a few seconds in a melted structure in the flat glass 3, until this structure cools. The correct value of the spacing of the roller axes of 200 mm is for a predetermined feed speed. When the speed changes, also the predetermined value of the spacing must change as well as the dwell time of the strip of material in the glass.

Figure 6A:
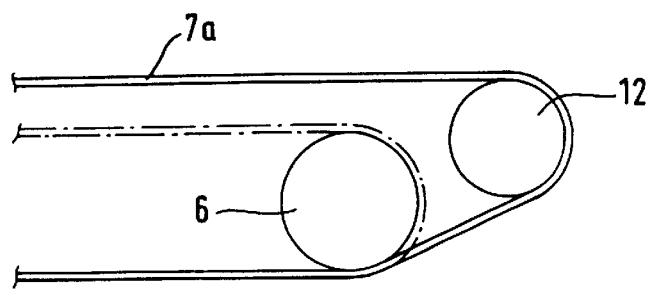
FIG. 6A is a diagrammatic side view of an additional device for the embodiment according to FIG. 6 including a tensioning roller for the purpose of tensioning the strip of material to compensate for thermal expansion during heating, especially on heating the forming tool.

Because the strip 7a of material is loosened by heating due to thermal expansion prior to and/or during contacting, it is advantageous according to the embodiment of FIG. 6a to provide a third non-structured roller as tensioning roller 12, which is used to put the strip of material under tension. The strip of material thus contacts the base roller only over a comparatively small angular range. Suitable structural elements for making the apparatus of FIG. 6 are available to one skilled in the art.

The embodiments described up to now are combinable with a laser for heating of the forming medium 7 and/or 7a. FIG. 7 shows an embodiment of FIG. 6 with a suitable laser radiation heating device. An array of several diode lasers placed side by side operate as the laser source 5. This laser strip produces a homogeneous radiation profile parallel to the roller axes over the width of the base roller 6. For bringing the laser radiation to the forming member 7a and for providing counter force members for the pressing force F the flat glass 3 slides over one side of a slide foot 4, guided by means of conveying rollers 13. The slide foot 4 is arranged besides the laser strip 5. A suitable laser is for example obtainable commercially with a power of 800 Watt at 0.5 m strip length. If a typical proportion of about 30% of the total power is converted into heat in the steel, the heating power is about 240 Watts. A forming member using a steel working material ran be heated in a time interval of about one minute about 100 K for a typical flat display screen glass which is 360 mm×650 mm. If the laser diodes are positioned over it above each other, the laser power can be multiplied several times.

The disclosure in German Patent Application 197 13 309.6-45 of Mar. 29, 1997 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a process and apparatus for hot forming precision structures in flat glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A process for hot forming precision structures in flat glass, said process comprising the steps of:
    a) pressing a structuring surface of a heated forming tool into glass material on a surface of the flat glass to form the precision structures; and
    b) prior to and/or during contacting of the structuring surface of the forming tool with the flat glass surface, heating the forming tool locally from an exterior until a predetermined surface depth determined by a height of the precision structures being formed has reached a process temperature at which melting of the glass material to form the precision structures occurs on contacting the heated forming tool with the flat glass surface.

2. The process as defined in claim 1, wherein laser radiation is directed through said flat glass to the structuring surface to provide the heating of the forming tool.

3. The process as defined in claim 2, further comprising providing an additional heating of the forming tool with an additional heat source other than that providing said laser radiation.

4. The process as defined in claim 3, wherein said additional heat source is a flame strip device.

5. The process as defined in claim 1, wherein the heating of the forming tool occurs by an inductive heating.

6. The process as defined in claim 1, wherein the heating of the forming tool occurs by an electrical resistance heating.

7. The process as defined in claim 1, wherein the structuring surface of the forming tool is heated to a temperature greater than Tg but less than Tk, wherein said Tg is a transition temperature of the glass being structured and said Tk is a temperature at which the forming tool adheres to the glass.

8. The process as defined in claim 1, further comprising pre-heating the flat glass by means of a suitable heat producing device to a temperature from 50 K to 200 K below Tg prior to the contacting of the heated forming tool with the flat glass surface, wherein said Tg is a transition temperature of the glass being structured.

9. The process as defined in claim 1, wherein said forming tool is made from a material having a comparatively small thermal conductivity and further comprising cooling said forming tool internally during heating of said forming tool in order to minimize heating of an interior of the forming tool below said predetermined surface depth.

10. The process as defined in claim 9, wherein the forming tool is continuously rolled over the flat glass surface to be structured.

11. The process as defined in claim 10, wherein the forming tool comprises a base tool and a forming member releasably attached to the base tool, and said forming member is provided with the structuring surface.

12. The process as defined in claim 11, wherein said forming member is pressed in said glass and left there during a cooling stage after said forming member is rolled over the forming tool.

13. An apparatus for performing a process of hot forming precision structures in or on flat glass, said apparatus comprising
    a forming tool provided with a structuring surface to be pressed into a surface of the flat glass to form the precision structures; and
    means for heating the forming tool locally from an exterior prior to and/or during contacting of the structuring surface of the forming tool with the glass surface until a predetermined surface depth in the forming tool determined by a height of the precision structures being formed in the glass has reached a process temperature at which a melting to form the precision structures occurs on contacting the forming tool to the glass surface.

14. The apparatus as defined in claim 13, wherein the means for heating is a radiation source.

15. The apparatus as defined in claim 14, wherein the radiation source is a laser.

16. The apparatus as defined in claim 15, wherein said laser comprises a laser diode array.

17. The apparatus as defined in claim 15, wherein said laser is arranged on a side of the flat glass opposite to the forming tool and emits laser radiation having wavelengths such that said laser radiation is transmitted through said flat glass.

18. The apparatus as defined in claim 13, wherein the forming tool comprises a base tool and a separate forming medium arranged releasably on the base tool, and said forming medium includes the structuring surface.

19. The apparatus as defined in claim 18, wherein said base tool comprises a material having a comparatively smaller thermal conductivity and said forming medium comprises another material with a comparatively larger thermal conductivity.

20. The apparatus as defined in claim 19, wherein said material for said base tool comprises a ceramic material.

21. The apparatus as defined in claim 20, wherein said material for said base tool has a comparatively smaller thermal expansion, while said another material has a comparatively larger thermal expansion.

22. The apparatus as defined in claim 21, wherein the forming medium comprises a structured sheet with reduced adherence for the flat glass.

23. The apparatus as defined in claim 22, wherein the structured sheet is releasably attached to the base tool.

24. The apparatus as defined in claim 23, wherein the base tool is a roller, the structured sheet is wound around the base tool and during the contacting the structured sheet is rolled off the base tool and onto the flat glass.

25. The apparatus as defined in claim 18, wherein the base tool comprises a roller.

26. The apparatus as defined in claim 18, wherein the base tool has a structure for securing the forming medium to the base tool.

27. The apparatus as defined in claim 25, wherein the forming medium comprises a strip of material wound around said base tool.

28. The apparatus as defined in claim 27, wherein the base tool has a guiding structure for said strip of material.

29. The apparatus as defined in claim 28, wherein the guiding structure follows a helical path extending circumferentially around said roller.

30. The apparatus as defined in claim 28, wherein the guiding structure is formed by circumferential rings and said circumferential rings are arranged perpendicular to a roller axis of said roller.

31. The apparatus as defined in claim 28, wherein the forming tool is provided with an auxiliary roller spaced axially parallel from said roller operating as said base tool, and said strip of said material is wound around both of said rollers and on the guiding structure for continuous supply and delivery of said strip of said material.

32. The apparatus as defined in claim 31, wherein the base tool is provided with means for supplying said strip of said material and the auxiliary roller is provided with means for delivery of said strip of said material.

33. The apparatus as defined in claim 31, further comprising a tensioning roller for tensioning said strip of material guided over said base tool and said auxiliary roller.

34. The apparatus as define in claim 13, wherein the structuring surface has raised structuring elements and the structuring surface of the forming tool has a predetermined conicity for improving release from hardened elements on the structuring surface.

* * * * *